W. O. BOYLE.
SPECTACLES ADJUSTER.
APPLICATION FILED FEB. 5, 1912. RENEWED MAR. 12, 1913.

1,061,216. Patented May 6, 1913.

WITNESSES:
A. B. Cornelius
Homer A. Osborn

INVENTOR:
William O. Boyle
BY Eugene Ayres,
ATTORNEY.

UNITED STATES PATENT OFFICE.

WILLIAM O. BOYLE, OF ST. JOSEPH, MISSOURI.

SPECTACLES-ADJUSTER.

1,061,216. Specification of Letters Patent. Patented May 6, 1913.

Application filed February 5, 1912, Serial No. 675,527. Renewed March 12, 1913. Serial No. 753,862.

*To all whom it may concern:*

Be it known that I, WILLIAM O. BOYLE, a citizen of the United States of America, residing at St. Joseph, in the county of Buchanan and State of Missouri, have invented certain new and useful Improvements in Spectacles-Adjusters, of which the following is a specification.

The purpose sought in this invention is to provide a means whereby persons who wear spectacles chiefly in reading may be relieved from the necessity of removing the spectacles when they enter into even a brief conversation or when they wish to attend to any matter in which they are inconvenienced by the lenses of the spectacles remaining in front of their eyes.

I accomplish my object by the mechanism shown in the accompanying drawings, in which,—

Figure 1:
Figure 2:
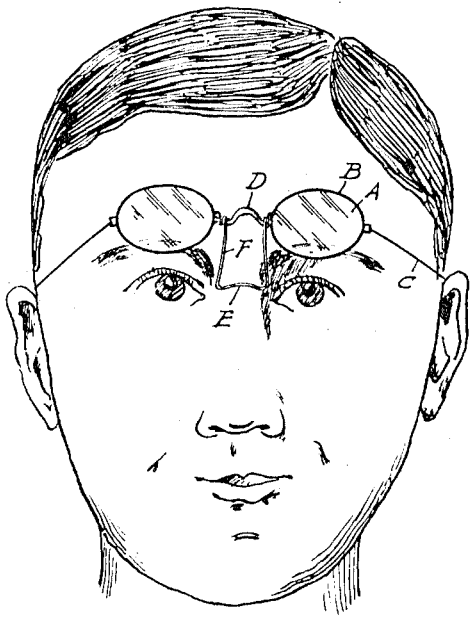
Figure 3:
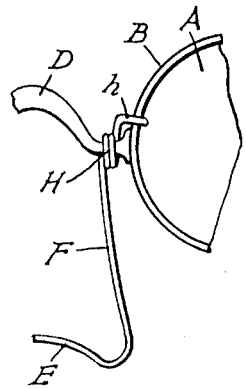

Figure 1 illustrates a pair of spectacles with the lower curved end of the adjuster resting on or near the bridge of the nose of a person wearing the same, while Fig. 2 illustrates the lenses of the spectacles raised above the eyes to the front of the forehead supported securely in that position by the lower curved end of the adjuster resting upon the nose of the person at the point in which the bridge of the spectacles rests in Fig. 1, and Fig. 3 is a detail of the adjuster, broken away at one side, showing the construction thereof and the preferable way for attaching the same to said bridge.

In said drawings and throughout the specification A A represent the lenses of a pair of spectacles, B B the frames therefor and C C the bows thereof.

D is a bridge connecting the frames of the lenses.

The adjuster consists, preferably, of a single piece of wire of any suitable spring metal. This wire is light weight having a thickness but little greater than a Number 12 sewing thread and should have considerable elasticity. The central part of this wire forms the curved bottom E of the adjuster; it is preferably flattened and bent upward and forward the curvature, practically, corresponding with that of bridge D. The upwardly projecting parts of the wire constitute supporting arms F F; ends H H of said wire are connected with bridge D in the valleys on either side of the bridge where the bridge connects with the frames of the lenses. Said ends are preferably wound loosely around the valley portions of said bridge and, as shown in Fig. 3, the tips *h h* of said ends are turned outward contacting with the faces of the rims of the lenses thus serving as stops to hold the entire adjuster in position, both when the bottom of the adjuster is resting on the bridge of the nose, as shown in Fig. 1, and when it is supporting the spectacles against the forehead in the position illustrated in Fig. 2.

From the foregoing description it will be seen that when the spectacles are in use the usual pressure on the nose between the eyes by the bridge of the spectacles is very largely overcome the curvature E of the adjuster resting upon the bridge of the nose bearing a large part of the weight or pressure.

Said wire arms F F are constructed of a metal sufficiently elastic to permit bridge D and curvature E to be lifted to the position shown in Fig. 2 or to be lowered to the position shown in Fig. 1. In the latter position said elasticity materially aids in relieving the nose from the pressure ordinarily caused by the bridge of the spectacles. The normal position of the adjuster frame is practically vertical with the bridge of the spectacles.

While I deem the construction shown the most desirable I reserve to myself the right to connect the loosely wound ends H H of arms F F of the adjuster frame to the ends of the spectacles bridge by means of hooks or snaps, and to solder said tips to the lens frames, or to connect said parts by any other means that are merely mechanical modifications of that described.

What I claim and desire to secure by Letters Patent, is:—

1. The combination with a pair of spectacles provided with lens frames and a connecting bridge, of a downwardly projecting spring metal adjuster frame comprising a curved portion and flexible arms connected with the bridge of the spectacles said curved portion adapted to be seated on the bridge of the nose when the spectacles are in use and to be seated in the normal position of the spectacles bridge when the spectacles are elevated, and in disuse, supported by said flexible arms.

2. The combination with the bows, lens frames, and connecting bridge of a pair of spectacles, of a spring metal frame having a curved portion at the bottom corresponding with that of said bridge, upwardly extended elastic arms, the ends of said arms curled loosely around the ends of said bridge adjacent to said lens frames, the tips of said ends bearing upwardly and outwardly into contact with the front of said lens frames.

3. The combination of a pair of lens frames, a connecting bridge, an spectacles adjuster comprising a single thread like elastic wire, the body portion thereof curved to be seated on a nose, the ends of said wire extending upward into springy and curled connection around the ends of the spectacles bridge, and the tips of said ends, said tips having pressure contact at all times against the front of the lens frames.

4. The combination with a pair of spectacles of a single thread like elastic wire, the body portion thereof curved forward and upward, the ends of said body portion having elastically curled connection around the ends of the bridge of the spectacles, and the upward and outward tips of the ends of said wire, said tips being always in contact with the front of the lens frames.

In testimony whereof I affix my signature in presence of two witnesses.

WILLIAM O. BOYLE.

Witnesses:
JAMES W. MUTTON,
JOHN G. PARKINSON.